United States Patent [19]

Jürgen

[11] Patent Number: 5,582,469
[45] Date of Patent: Dec. 10, 1996

[54] VALVE UNIT WITH VALVES LOCATED OPPOSITE ONE ANOTHER

[75] Inventor: Zechmann Jürgen, Heilbronn, Germany

[73] Assignee: Robert Bosch GmbH, Stuttgart, Germany

[21] Appl. No.: 392,830

[22] PCT Filed: Jun. 15, 1994

[86] PCT No.: PCT/DE94/00665

§ 371 Date: Feb. 28, 1995

§ 102(e) Date: Feb. 28, 1995

[87] PCT Pub. No.: WO95/01525

PCT Pub. Date: Jan. 12, 1995

[30] Foreign Application Priority Data

Jun. 30, 1993 [DE] Germany ............. 43 21 695.1

[51] Int. Cl.$^6$ .................. F16B 13/08; B60T 8/36
[52] U.S. Cl. .................... 303/119.2; 137/596.17
[58] Field of Search ............. 303/119.2, 113.1; 137/599.16, 599.12, 595, 599

[56] References Cited

U.S. PATENT DOCUMENTS

| | | | |
|---|---|---|---|
| 1,690,251 | 11/1928 | Schlesinger et al. | 137/599 |
| 3,921,666 | 11/1975 | Leiber | 303/119.2 |
| 4,568,131 | 2/1986 | Blomberg et al. | 303/119.2 |
| 5,402,824 | 4/1995 | Hosoya et al. | 303/119.2 |

FOREIGN PATENT DOCUMENTS

| | | | |
|---|---|---|---|
| 2812390 | 10/1978 | Germany | 303/119.2 |
| 5345560 | 12/1993 | Japan | 303/119.2 |

*Primary Examiner*—Matthew G. Graham
*Attorney, Agent, or Firm*—Edwin E. Greigg; Ronald E. Greigg

[57] ABSTRACT

The invention relates to a valve unit with at least one pair of coaxial valves located opposite one another. According to the invention, a valve element common to both valves is designed as a one-piece sleeve-shaped valve element which is mounted fixedly in a bore of a valve housing and which, on each of its two end faces, has a respective valve seat for cooperation with the movable valve body of the respective associated valve.

21 Claims, 2 Drawing Sheets

VALVE UNIT WITH VALVES LOCATED OPPOSITE ONE ANOTHER

STATE OF THE ART

The invention proceeds from a conventional valve unit with a pair of coaxial valves located opposite one another in relation to a reference plane in which a pressure-medium channel extends. A valve unit of this type is described in U.S. Pat. No. 4,612,845. The known valve unit possesses a block-like stationary valve element serving at the same time as a valve housing and having an axially continuous middle bore, to which the pressure-medium channel is connected in the form of a transverse bore leading to the outside of the valve element or of the valve housing. Further transverse bores serve for connecting a pump and a consumer and, in conjunction with an axial bore, for making a pressure-medium connection to regions of the middle bore which are provided axially at a distance from one another.

In the known valve unit, movable valve bodies actuable by controllable drive devices and belonging to two coaxially arranged valves cooperate with the stationary block-like or housing-like valve element, the movable valve bodies having portions of larger and smaller diameter located in succession in the axial direction, thereby providing control edges and control faces for the opening and closing of pressure-medium connections. The drive devices designed as electromagnetic drive devices and intended for the movable valve bodies are mounted on the outside of the stationary valve element.

An important advantage of the known valve unit according to the abovementioned U.S. Pat. No. 4,612,845 is that a double valve having two separately controllable individual valves can acquire a highly compact design as a result of the use of a common stationary valve element which serves at the same time as a valve housing. Where particularly small valves are concerned, however, it occasionally proves difficult to make the various bores, annular grooves and connecting channels cost-effectively and with the necessary accuracy in the block-like valve element.

Furthermore, U.S. Pat. No. 4,690,465 discloses a comparatively compact, piezoelectrically actuated valve unit with a plurality of pairs of coaxial valves which are located opposite one another in relation to a reference plane and in which the movable valve bodies are spherical valve bodies which are under spring pretension and each of which cooperates with a conical or tapered valve seat as a stationary valve element. At the same time, the valve seats are provided in plate-like elements of a valve housing constructed from a plurality of individual parts screwed together with one another. The division of the housing into a plurality of individual elements allows a relatively simple and accurate machining of the individual valve seats, but entails altogether increased production costs, since the individual elements of the valve housing have to be adjusted accurately relative to one another, in order to orient the individual portions of continuous pressure-medium channels in alignment with one another and in relation to the valve seats.

SET OBJECT

Proceeding from the state of the art discussed above, particularly according to U.S. Pat. No. 4,612,845, the object on which the present invention is based is to specify an improved valve unit which can be produced in a space-saving and cost-effective way particularly in the form of a hydraulic ABS valve unit with two pairs of coaxial valves located opposite one another, namely one pair of inlet valves and one pair of outlet valves.

ADVANTAGES OF THE INVENTION

The set object is achieved by means of a valve unit according to the invention having an advantage that a cost-effective and accurate fabrication of the valve seat becomes possible as a result of the separate production of the stationary valve element common to both valves.

A further important advantage of the valve unit according to the invention is that the correct spacing between the valve seats can be provided as early as during the production of the stationary valve element, so that no further adjustment work is necessary in this respect for the two valves of the particular pair of valves. Moreover, the stationary valve element produced as a precision part can subsequently be brought easily with a press fit into the desired position inside the valve housing, in order to achieve an alignment of the transverse bore with the pressure-medium channel, and if appropriate the desired position can be predetermined by a shoulder which, in a bore of the valve housing, serves as a stop during the mounting of the stationary valve element.

Advantageous developments and improvements of the valve unit are possible as a result of the measures or features specified in the subclaims.

In particular, in one embodiment of the invention, there is the advantageous possibility of designing the valve unit as a hydraulic ABS valve unit with two pairs of electromagnetically actuable valves, one pair of valves of which comprises two inlet valves, whilst the other pair of valves comprises two outlet valves. Furthermore, in this embodiment of a valve unit according to the invention, there is the advantageous possibility of connecting two outlet conduits, leading to separate wheel-brake cylinders, to a bleed channel of the valve unit, in each case via an associated non-return valve of a non-return valve arrangement, in order to bring about rapid relief in the event of excess pressure.

DRAWING

Further particulars and advantages of the invention are explained in more detail below by means of a selected, particularly advantageous exemplary embodiment of a valve unit according to the invention, in conjunction with a drawing. In this:

FIG. 1 shows an axial, partially diagrammatic longitudinal section through the valve unit according to the invention, and FIGS. 2 and 3 show detailed representations of two preferred embodiments of non-return valve devices for the valve unit according to FIG. 1.

DESCRIPTION OF THE EXEMPLARY EMBODIMENT

Figure 1:
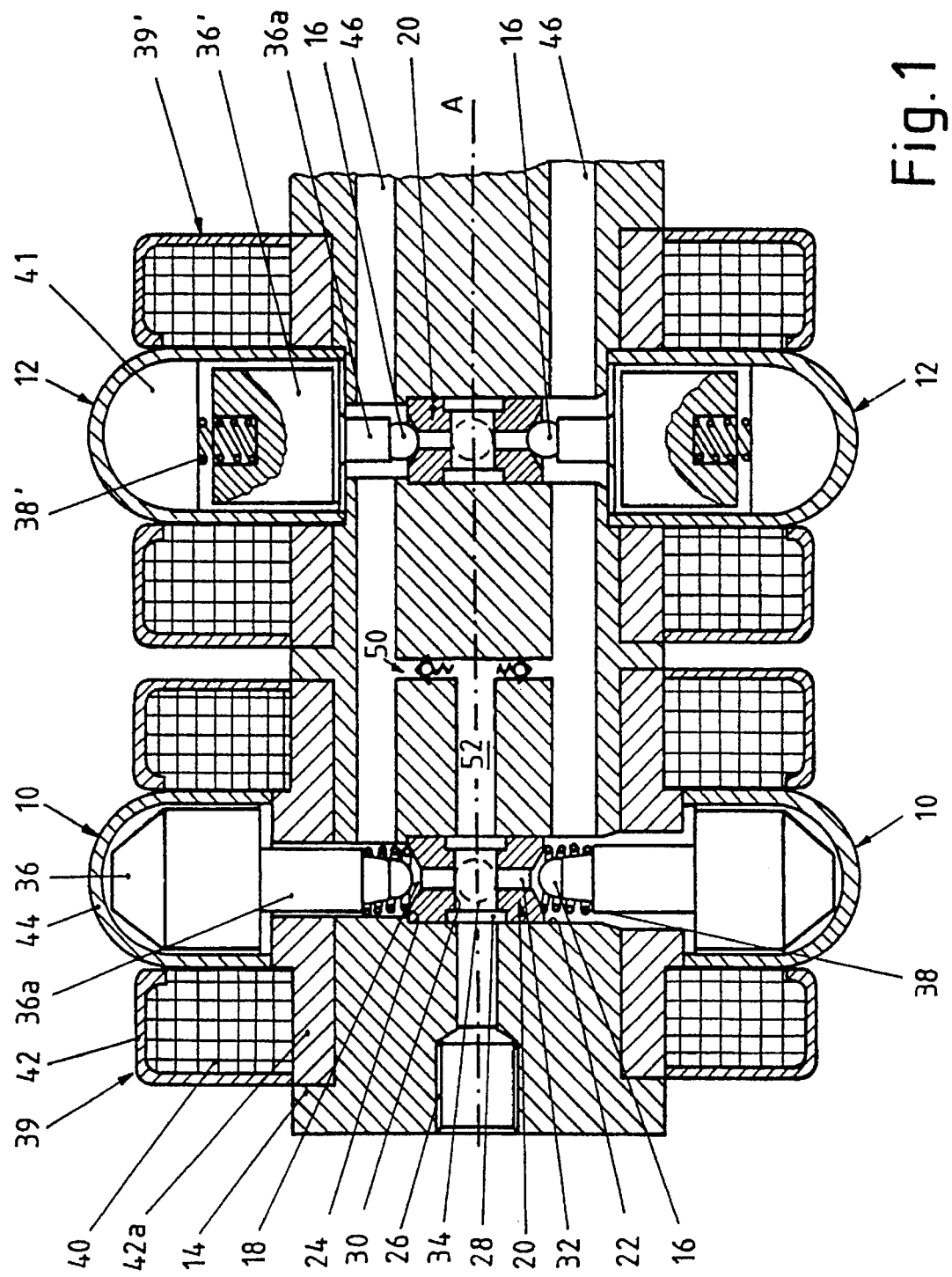

In particular, FIG. 1 shows, as an exemplary embodiment of the invention, a valve unit which is designed as a hydraulic ABS valve unit. This valve unit comprises a first pair of valves with two inlet valves 10 and a second pair of valves with two outlet valves 12.

The inlet valves 10 and the outlet valves 12 are built on a common valve housing 14 or built into this; furthermore, all four individual valves 10, 12 are electromagnetically actuable valves, as is explained in more detail below.

If the inlet valves 10 are considered first, it becomes clear from FIG. 1 of the drawing that each of these valves 10 has a movable spherical valve element or a spherical valve body 16. The two spherical valve bodies 16 each cooperate with a tapered or conical valve seat 18. At the same time, the valve seats 18 are provided on the end faces of a stationary valve element 20 common to the two inlet valves 10. The stationary valve element 20 is a sleeve-shaped, generally cylindrical body which is arranged with a press fit in a bore 22 of the valve housing 14, in the exemplary embodiment the said bore 22 having a shoulder 24 which, when the valve element 20 is pressed into the bore 22, serves as a stop for the exact positioning of the valve element 20. It has been shown, however, that, if a suitable pressing tool is used and if an outer face of the valve housing 14 is used as a reference face, an exact positioning of the stationary valve element 20 in the bore 22 of the valve housing 14 is readily possible even without the presence of a shoulder 24.

In its installed position shown in FIG. 1, the valve element 20 is arranged symmetrically to a reference plane A indicated by a dot-and-dashed line, the line A coinciding with the axis of a pressure-medium channel 26 provided in the housing 14 and having an inlet region which is equipped with an internal thread and to which an external connection, especially the connection of a brake master cylinder, can be attached by means of a conventional fitting (not shown). The inner end of the pressure-medium-channel 26 opens into an annular groove 28 of the valve element 20. Starting from the annular groove 28, the valve element 20 possesses a transverse bore 30 which intersects an axially continuous middle bore 32 of the stationary valve element 20. A second transverse bore 34 perpendicular to the transverse bore 30 and indicated by broken lines connects the middle bore 32, in practice, to the delivery side of a motor-driven return pump (not shown).

In both inlet valves 10, the valve balls or movable valve bodies 16 cooperating witch the respective associated valve seat 18 are connected to a tenon-like extension 36a of an armature 36. In practice, the connection of the valve ball 16 to the armature 36 is generally made by forming on the free end face of the extension 36a a conical seat, in which the valve ball 16 is fixed by welding or adhesive bonding, but especially by hard soldering. The movable spherical valve element 16 thereby becomes an integral component of the armature 36. The armature 36 is pretensioned resiliently outwards relative to the reference plane or plane of symmetry A of the valve housing 14 by means of a compression spring in the form of a helical spring 38, the ends of the helical spring 38 being supported, on the one hand, on a shoulder on the extension 36a and, on the other hand, on the associated end face of the stationary valve element.

The armature 36 cooperates with a magnetic circuit 39 which has, as a main component, a coil 40 which is surrounded by a housing 42 made of magnetically conductive material. By means of the magnetic circuit 39 or by generating an exciting current in the coil 40, it is possible to generate for the armature 36 a magnetic field, by means of which the latter is moved inwards counter to the force of the helical spring 38, until the valve body 16 bears sealingly against the associated valve seat 18. When the magnetic flux ceases, the armature 36 is pressed outwards again by the spring 38, a cup-shaped cover, designated below as dome 44, forming a stop for the outward movement of the armature 36. The dome 44 and the housing 42 or its individual parts are at the same time connected sealingly to one another, especially pressed, caulked or welded together, in order to protect the armature and magnetic circuit against external influences. It becomes clear from FIG. 1 that a baseplate 42a of the housing 42 is fixed in a corresponding recess of the valve housing 14, especially is pressed into the said recess, the bottom of the depression forming a stop for positioning the above-described outer valve parts in relation to the stationary valve element 20.

In the hydraulic ABS valve unit considered as an exemplary embodiment, the inlet valves 10 are normally open when the coils 40 are currentless and close when a corresponding exciting current flows in the coils 40. When the inlet valves 10 are open, the pressure-medium channel 26 is connected via the transverse bore 30 and the middle bore 32 of the stationary valve element 20 to two parallel axial channels 46 which are provided in the valve housing 14 and at the outlet end of which, on the right in FIG. 1, connections (not shown) are provided for wheel-brake cylinders, one of the channels 46 being assigned, for example, to the wheel-brake cylinders of a pair of front wheels of a motor vehicle, whilst the other channel is assigned to the wheel-brake cylinders of a pair of rear wheels. The wheel-brake cylinders can thus be loaded with pressure, with the proviso that the outlet valves 12 are closed, this being the case in the valve unit shown when the coils of the magnetic circuit are currentless, as explained below.

In particular, in the case of the outlet valves 12 which are otherwise designed identically to the inlet valves 10, instead of the inner helical springs 38 there is provided an outer helical spring 38' which is supported, on the one hand, on the armature 36' and, on the other hand, on an element 41 made of magnetizable material, which bears against the inside of the dome 44 and which forms a component of the magnetic circuit 39'. As a result of the above-described arrangement of the helical spring 38', each of the outlet valves 12 is pretensioned into its closed position and opens in response to an outward movement of the armature 36' when a corresponding exciting current flows through the coil 40. During the opening of the outlet valves 12, a connection to the return pump (not shown) is made, if appropriate by way of an intermediate reservoir, via the middle bore 32 and the transverse bore 34 (indicated by broken lines) of the stationary valve element 20 assigned to the outlet valves 12, so that a pressure reduction on the wheel-brake cylinders takes place virtually without delay.

Altogether, in the valve unit shown in FIG. 1, the selective activation of the inlet valves 10, on the one hand, and of the outlet valves 12, on the other hand, according to the foregoing description affords the possibility of loading the wheel-brake cylinders connected to the channels 46 with pressurized pressure medium and of reducing the pressure medium in order to terminate or interrupt a braking operation by opening the outlet valves 12. At the same time, despite the two pairs of valves, the valve unit as a whole has a highly compact design, since the pressure-medium supply on the inlet side of the inlet valves and the pressure-medium discharge on the outlet side of the outlet valves, in each case in the region of the particular stationary valve element 20 common to a pair of valves, take place in an extremely space-saving manner with a space requirement which, for reasons of construction, is only insignificantly greater than the space requirement for the middle bores, the transverse bores and the valve seats. Furthermore, as regards the positioning of the common stationary valve element, on the one hand, and of the outer valve parts having the drive devices, on the other hand, no difficulties arise owing to the presence of stop faces and/or the use of suitable pressing tools, so that an exact adjustment of the four individual valves of the valve unit is also easily possible.

In addition to the valves described above, in the valve unit according to FIG. 1, between the channels 46 leading to the wheel-brake cylinders there is also provided a non-return valve arrangement 50 which is indicated only entirely diagrammatically in FIG. 1 and which, for each of the channels 46, comprises a respective non-return valve which opens in the event of excess pressure in the particular associated channel 46 and which thus allows a rapid pressure relief, in that a corresponding quantity of the pressure medium which is under high pressure is diverted into a bleed channel 52 provided in the housing 14 and then flows to the brake master cylinder.

Figure 2:
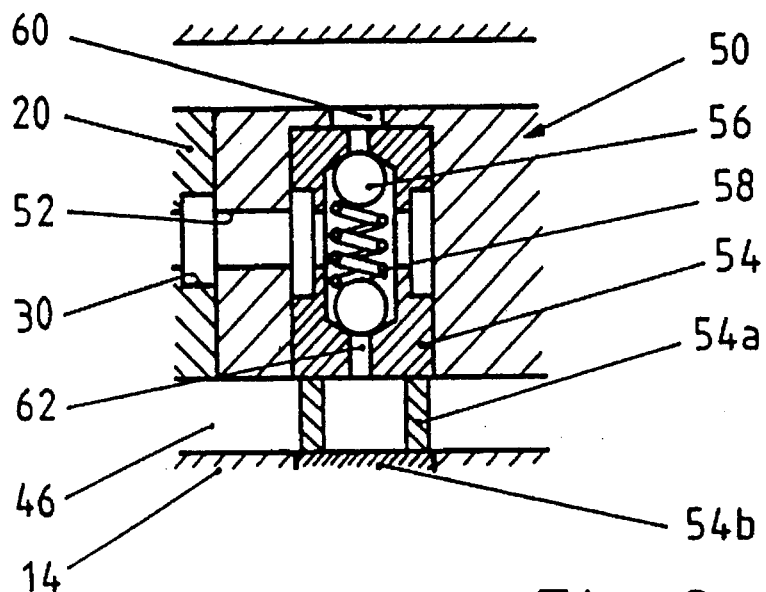
Figure 3:
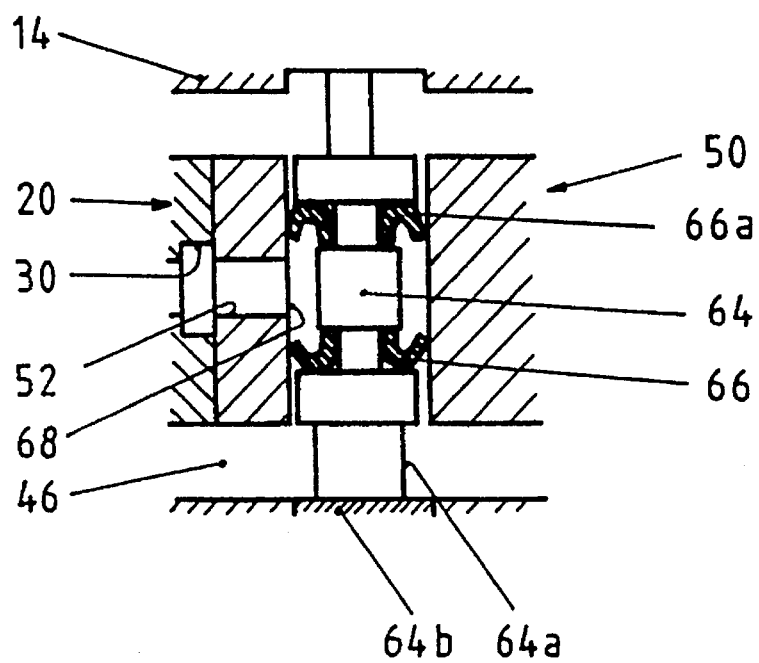

FIGS. 2 and 3 show two preferred exemplary embodiments of non-return valve arrangements for a valve unit according to FIG. 1.

In particular, FIG. 2 shows a non-return valve arrangement 50 with its own small valve housing 54. Provided in a chamber inside this small valve housing are two valve balls 56 which are pretensioned outwards, by means of a compression spring 58 arranged between them, against valve seats, one valve seat belonging to an inlet orifice 60 which is assigned to one channel 46, whilst the other valve seat belongs to an inlet orifice 62 which is open to the other channel 46. In the event of excess pressure in one of the channels 46, the respective valve ball 56 lifts off from its valve seat counter to the spring force, thereby making a connection between the inlet orifice 60 or 62 and the bleed channel 52 which, in the exemplary embodiment, opens directly into the annular groove 28 of the adjacent stationary valve element 20. The pressure medium entering the bleed channel 52 can thus be discharged to the brake master cylinder by releasing the brake pedal, with the inlet valves 10 closed and with the brake master cylinder relieved. The two non-return valves of the non-return valve arrangement 50 therefore constitute, for each of the normally open inlet valves 10, a respective "one-way bypass" to the brake master cylinder (not shown) connected to the connection 26.

In the exemplary embodiment, the small housing 54 comprises struts 54a, or also a perforated wall, which pass through the channel 46, without blocking this, and at the outer ends of which is provided a plug 54b which serves for sealingly closing a bore made for mounting the non-return valve arrangement 50 in the valve housing 14.

The non-return valve arrangement shown in FIG. 3 has a ram-like element 64 which possesses regions of larger and smaller diameter successively in the axial direction and which carries two collars 66 which are designed with an essentially U-shaped cross-section and the U-profile of which opens to the side facing away from the respective associated channel 46. The ram-like carrier element 64 together with the collars 66 is mounted between the channels 46 in a bore 68 of the valve housing 14, so that a chamber forms between the collars 66 in the bore 68 and is connected to the bleed channel 52 which itself is guided to the annular groove 28. Each of the collars 66 possesses a peripheral outer sealing lip 66a which normally bears sealingly against the wall of the bore 68, but which, in the event of excess pressure in the associated channel 46, shifts radially inwards and thereby opens a connection via the bleed channel 52 in the direction of the brake master cylinder. The collars 66 together with their sealing lips 66a therefore act in a similar way to the resiliently pretensioned valve balls in the non-return valve arrangement according to FIG. 2. Furthermore, the ram-like element 64 also possesses a web-like prolongation 64a terminating in a plug 64b which serves for sealingly closing a bore located in the valve housing 14 and made for mounting the non-return valve arrangement 50.

As becomes clear from the foregoing explanation of the non-return valve arrangement, particularly in conjunction with FIGS. 2 and 3, in an advantageous embodiment of the invention a compact non-return valve arrangement ensuring, as required, a rapid pressure relief of the wheel-brake cylinders can be produced especially in conjunction with the inlet valves and particularly in conjunction with the stationary valve element of these.

In conclusion, attention is drawn to the fact that the claims and particularly the main claim are attempts at a formulation of the invention without a comprehensive knowledge of the state of the art and therefore without any restricting prejudice. The right is therefore reserved to consider all the features represented in the description, claims and drawing as essential to the invention both individually in themselves and in any combination with one another, to set them down in the claims and to reduce the feature content of the main claim.

What is claimed is:

1. A valve unit with at least one pair of coaxial valves located opposite one another in relation to a reference plane of a valve housing (14) in which a pressure-medium channel (26) extends, having a fixed common valve element (20) with an axially continuous middle bore (32) which extends to opposite valve seats (18), a transverse bore (30) is connected to said middle bore (32) and to the pressure-medium channel (26), each valve element includes a movable valve body (16), each of which cooperate with said valve seats (18) and is actuable by separate controllable drive devices, for opening and closing a pressure-medium connection from or to the axial middle bore (32) via said common valve element, the common valve element (20) is designed as a one-piece sleeve-shaped valve element (20) which is mounted fixedly in a bore of said valve housing (14) and has one of said valve seats (18) on each of two end faces, and said valve seats are closed and opened by said movable valve bodies (16).

2. A valve unit according to claim 1, in that each of the valves (10, 12) is designed with electromagnetic drive devices (39, 39') and has an armature (36, 36') which is under a spring pretension and which supports the movable valve bodies (16).

3. A valve unit according to claim 2, in which each of the movable valve bodies are designed as a valve ball (16) and are connected in one piece to the armature (36, 36') of the associated valve (10, 12).

4. A valve unit according to claim 3, in which said valve unit is a hydraulic ABS valve unit with first and second pairs of valves (10, 12), of which the first pair of valves are normally open inlet valves (10) and the second pair of valves are normally closed outlet valves (12) on an outlet side.

5. A valve unit according to claim 4, in which two pressure-medium channels (46) are located on the outlet side, and the two pressure-medium channels (46) located on the outlet side are each connected via a non-return valve of a non-return valve arrangement (50) to a bleed channel (52) for rapid pressure reduction in the two pressure-medium channels (46) located on the outlet side.

6. A valve unit according to claim 5, in which the non-return valve arrangement (50) comprises two non-return ball valves (56) which are each connected to one each of the pressure-medium channels (46) located on the outlet side and the two valve balls (56) are jointly under a pretension of a pretensioning spring (58) acting on both of the valve balls (56).

7. A valve unit according to claim 3, in which a further transverse bore (34) is provided in said valve housing (14)

transversely to the transverse bore (30) in the common valve element (20).

8. A valve unit according to claim 2, in which said valve unit is a hydraulic ABS valve unit with first and second pairs of valves (10, 12), of which the first pair of valves are normally open inlet valves (10) and the second pair of valves are normally closed outlet valves (12) on an outlet side.

9. A valve unit according to claim 8, in which two pressure-medium channels (46) are located on the outlet side, and the two pressure-medium channels (46) located on the outlet side are each connected via a non-return valve of a non-return valve arrangement (50) to a bleed channel (52) for rapid pressure reduction in the two pressure-medium channels (46) located on the outlet side.

10. A valve unit according to claim 9, in which the non-return valve arrangement (50) comprises two non-return ball valves (56) which are each connected to one each of the pressure-medium channels (46) located on the outlet side and the two valve balls (56) are jointly under a pretension of a pretensioning spring (58) acting on both of the valve balls (56).

11. A valve unit according to claim 9, in which the non-return valve arrangement (50) comprises, for each of the pressure-medium channels (46) located on the outlet side, a collar (66) having a sealing lip (66*a*) which, in the event of excess pressure, is deflected in order to open a connection to a brake master cylinder via a bleed channel (52).

12. A valve unit according to claim 2, in which a further transverse bore (34) is provided in said valve housing (14) transversely to the transverse bore (30) in the common valve element (20).

13. A valve unit according to claim 1, in which said valve unit is a hydraulic ABS valve unit with first and second pairs of valves (10, 12), of which the first pair of valves are normally open inlet valves (10) and the second pair of valves are normally closed outlet valves (12) on an outlet side.

14. A valve unit according to claim 13, in which a further transverse bore (34) is provided in said valve housing (14) transversely to the transverse bore (30) in the common valve element (20).

15. A valve unit according to claim 13, in which two pressure-medium channels (46) are located on the outlet side, and the two pressure-medium channels (46) located on the outlet side are each connected via a non-return valve of a non-return valve arrangement (50) to a bleed channel (52) for rapid pressure reduction in the two pressure-medium channels (46) located on the outlet side.

16. A valve unit according to claim 15, in which the non-return valve arrangement (50) comprises two non-return ball valves (56) which are each connected to one each of the pressure-medium channels (46) located on the outlet side and the two valve balls (56) are jointly under a pretension of a pretensioning spring (58) acting on both of the valve balls (56).

17. A valve unit according to claim 15, in which the non-return valve arrangement (50) comprises, for each of the pressure-medium channels (46) located on the outlet side, a collar (66) having a sealing lip (66*a*) which, in the event of excess pressure, is deflected in order to open a connection to a brake master cylinder via a bleed channel (52).

18. A valve unit according to claim 1, in which a further transverse bore (34) is provided in said valve housing (14) transversely to the transverse bore (30) in the common valve element (20).

19. A valve unit according to claim 18, in which two pressure-medium channels (46) are located on the outlet side, and the two pressure-medium channels (46) located on the outlet side are each connected via a non-return valve of a non-return valve arrangement (50) to a bleed channel (52) for rapid pressure reduction in the two pressure-medium channels (46) located on the outlet side.

20. A valve unit according to claim 19, in which the non-return valve arrangement (50) comprises two non-return ball valves (56) which are each connected to one each of the pressure-medium channels (46) located on the outlet side and the two valve balls (56) are jointly under a pretension of a pretensioning spring (58) acting on both of the valve balls (56).

21. A valve unit according to claim 19, which the non-return valve arrangement (50) comprises, for each of the pressure-medium channels (46) located on the outlet side, a collar (66) having a sealing lip (66*a*) which, in the event of excess pressure, is deflected in order to open a connection to a brake master cylinder via a bleed channel (52).

* * * * *